(12) United States Patent
Barrett, Jr.

(10) Patent No.: US 10,569,736 B2
(45) Date of Patent: Feb. 25, 2020

(54) EMERGENCY SEATBELT RELEASE

(71) Applicant: Rolin F. Barrett, Jr., Raleigh, NC (US)

(72) Inventor: Rolin F. Barrett, Jr., Raleigh, NC (US)

(*) Notice: Subject to any disclaimer, the term of this patent is extended or adjusted under 35 U.S.C. 154(b) by 0 days.

(21) Appl. No.: 14/752,124

(22) Filed: Jun. 26, 2015

(65) Prior Publication Data

US 2015/0375712 A1  Dec. 31, 2015

Related U.S. Application Data

(60) Provisional application No. 62/017,609, filed on Jun. 26, 2014.

(51) Int. Cl.
*B60R 22/32* (2006.01)
*B60R 22/34* (2006.01)

(52) U.S. Cl.
CPC ................ *B60R 22/3416* (2013.01)

(58) Field of Classification Search
CPC .... B60R 22/32; B60R 22/325; B60R 22/3416
See application file for complete search history.

(56) References Cited

U.S. PATENT DOCUMENTS

| | | | | |
|---|---|---|---|---|
| 3,503,571 A | * | 3/1970 | James | B60R 22/405 |
| | | | | 242/378.4 |
| 4,083,581 A | * | 4/1978 | Clifford | B60R 22/41 |
| | | | | 280/803 |
| 4,090,735 A | * | 5/1978 | Czernakowski | A62B 35/00 |
| | | | | 242/384.1 |
| 4,234,209 A | * | 11/1980 | Ikesue | B60R 22/41 |
| | | | | 242/384.1 |
| 4,344,588 A | * | 8/1982 | Hollowell | B60R 22/3416 |
| | | | | 242/378.4 |

* cited by examiner

*Primary Examiner* — Sang K Kim
(74) *Attorney, Agent, or Firm* — Pepper Hamilton LLP

(57) ABSTRACT

An emergency seatbelt release apparatus is disclosed for use in a seatbelt mechanism. The release apparatus includes a release actuator coupled to a seatbelt locking member to facilitate selective unlocking of the seatbelt locking mechanism from a biased locked position.

1 Claim, 1 Drawing Sheet

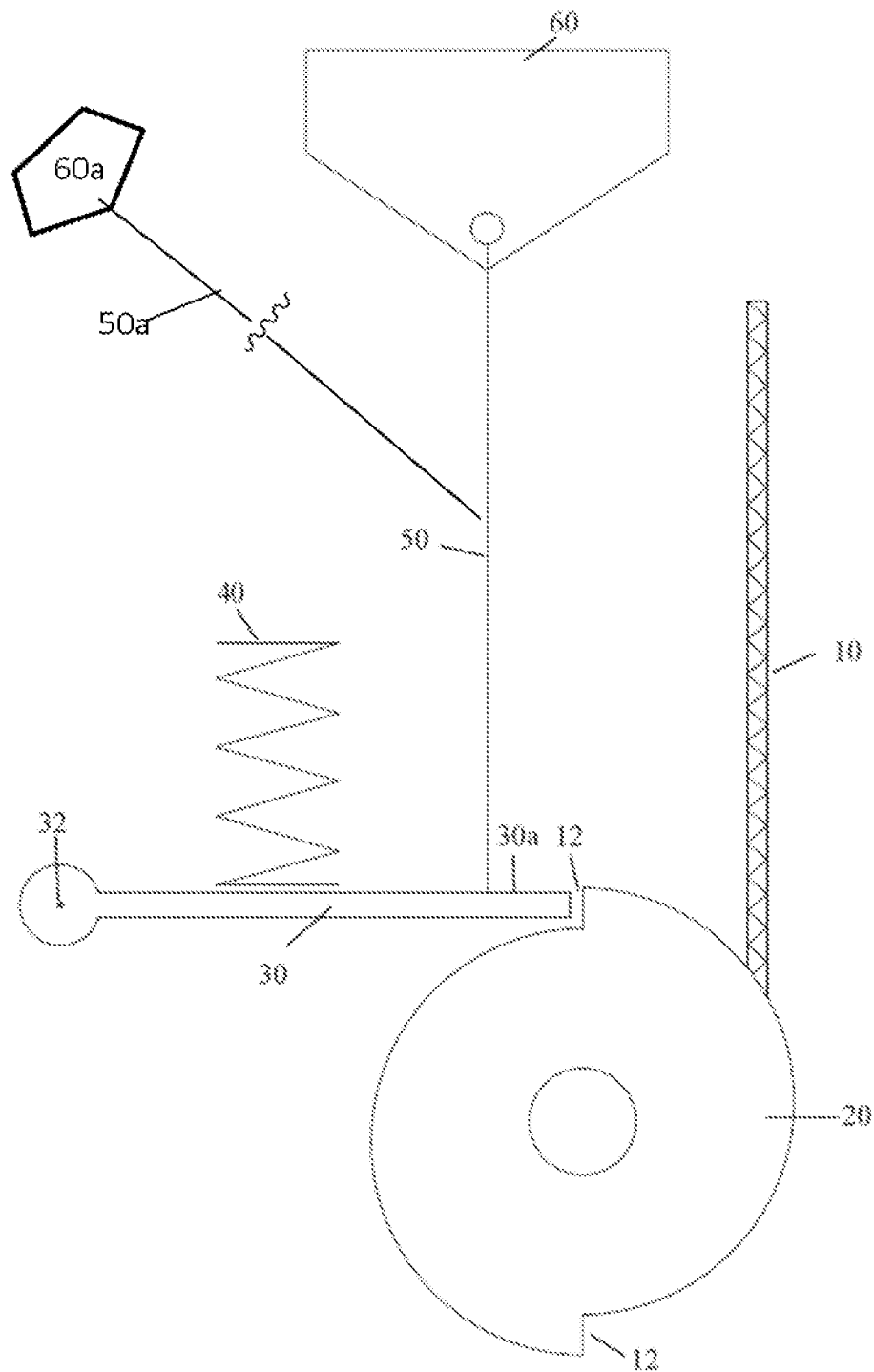

EMERGENCY SEATBELT RELEASE

CROSS REFERENCE TO RELATED APPLICATION

This application claims the benefit of U.S. Provisional Application Ser. No. 62/017,609 filed Jun. 26, 2014, which is incorporated herein by reference in its entirety.

FIELD

This disclosure relates to safety devices, particularly to safety devices for disengaging an automotive seatbelt in the event of an emergency.

BACKGROUND

Seatbelt devices for holding the occupant of a vehicle in his/her seat are provided with an emergency lock mechanism that is driven by a sensor that reacts to sudden acceleration, shocks or deceleration, so that, as a result, the emergency lock mechanism physically locks the drawing out of the webbing. The occupant can be thus effectively and safely restrained.

In order to enhance occupant protection, the latest seatbelt devices are provided with a pretensioner for removing webbing slack during an emergency, such as a vehicle collision. The modern seatbelt is a complex device. For all its complexity, and all it does, the modern seatbelt has some room for improvement. In particular, in the event a seatbelt does not unlatch and/or cannot be drawn-out, there is no easy way to remedy the situation other than to cut the seatbelt webbing, which in and of itself is not an easy task, by design.

Although the strong nature of each of the latch mechanism, the emergency locking mechanism, and the webbing itself combine effectively to protect a vehicle occupant during a crash, it creates a potentially dangerous situation afterwards, in that when either or both the latch and emergency lock mechanism fail to release, it can prevent medical personnel from having access to a victim or may prevent a victim from being able to leave or be removed from a vehicle in a timely manner. Accordingly, a quick, easy, and remote way to release the tension in a seatbelt is desirable. Once tension is released, the belt can be extended providing easier access to the vehicle occupant, whether driver or passenger.

BRIEF DESCRIPTION OF THE DRAWINGS

The sole figure is a schematic view of an emergency seatbelt release mechanism in accordance with some embodiments.

DETAILED DESCRIPTION

In one form, the emergency locking mechanism involves a takeup reel for holding and drawing in or drawing out the seatbelt webbing.

In some instances, particularly in the case of an accident, the release of a seatbelt is desirable remote from the seatbelt itself. In some instances, damage near the seat and seatbelt itself could cause damage to the release mechanism or obstruct access to the actuator. Accordingly, a release actuator at a remote location, such as under the hood, in a glove box, or in the trunk of the vehicle may be advantageous. The actuator may take any form, but in its simplest form, the actuator is a button, lever, or other such device operably connected to the emergency locking mechanism via a linkage. The linkage is connected to the actuator and the locking mechanism, such that when the actuator is engaged, the linkage moves the locking mechanism to an open position permitting draw out of the seatbelt webbing.

For example, as shown FIG. 1, a typical seatbelt includes a length of belt 10 attached to a reel 20. The reel 20 has one or more lock points 12. When locked, a locking member 30 pivots, about axis 32 into place and engages one of the lock points 12, preventing further rotation of the reel 20, and thus further extension of the belt 10. A biasing spring 40 is present biasing the lock member 30 into a position for engaging the lock point 12. A linkage 50, such as a cable, can be provided at the moveable end 30a of the locking member 30 such that pulling on the linkage 50 raises the locking member 30 out of the engaged position thereby permiting free movement of the reel 20 allowing the belt 10 to be extended. In some embodiments, the linkage 50 can be a simple cable routed through the vehicle to a remote location where the cable terminates with a handle 60 for pulling the cable to facilitate release.

In some embodiments, a more elaborate system may be employed through a series of mechanisms, such as cables, pulleys, linkages, etc. Regardless, a locking member of the seatbelt mechanism is operatively connected to a release member. In some instances, this may be a simple pull handle as described above. In others, a button, lever, or even an electromechanical switch and motor may be used to facilitate moving the locking member to the unlocked position. In some instances, an electromechanical solution is undesirable, as in an accident, the electrical system of the vehicle could be compromised. Nevertheless, such systems may be employed. In some instances, a separate electrical supply could be employed to minimize the effect or possibility of such problems.

Alternatively, the actuator may be more local to the reel mechanism. Many seatbelt reels are purposely designed with a feature to retain a vehicle child seat. This feature is commonly activated by fully extending the seatbelt, thereby causing the reel to function in its retraction-only mode to firmly hold the child seat. Unfortunately, adult and child occupants not in a child seat have, on occasion, been trapped, and even injured, when the reel inadvertently entered the retraction-only mode. Any movement of the trapped occupants may allow the seatbelt to further tighten, worsening the situation.

An emergency release apparatus as described herein could be mounted within reach of a trapped occupant, thus allowing their release without injury to the occupant or damage to the seatbelt, seatbelt reel, or related parts. For example, the reel mechanism is often housed in the vehicle sidewall or B-Pillar. An actuator, such as a button, lever, slide, switch, etc. could be provided on the interior of the vehicle proximate the reel mechanism for facilitating unlocking of the reel mechanism. In these embodiments, the principle is the same, but the linkage is shorter or possibly omitted. The actuator is operatively coupled to the locking mechanism such that activating the actuator causes the locking mechanism to disengage from the reel, thus permitting free rotation of the reel to facilitate access to the vehicle occupant.

Regardless of whether the actuator is remote or local, in some embodiments, the actuator may be returned manually, or automatically via a spring or other biasing mechanism, to its normal position whereby the locking mechanism and reel return to normal operation. In other embodiments, the actuator is held in an engaged position maintaining the free rotation of the reel. These embodiments take into account the likelihood that the release mechanism will only be used in emergencies, and once activated, it would be beneficial to remain so.

In some embodiment, the emergency release mechanism can be deactivated and the seatbelt mechanism returned to fully functional operation without the need to repair or replace any parts of the seatbelt, seatbelt mechanism, or the emergency release mechanism.

What is claimed is:

1. An emergency seatbelt release apparatus for use in a seatbelt mechanism having a takeup reel with one or more lock points and a locking member biased to engage the locking point to prevent undesired drawout of seatbelt webbing, the emergency seatbelt release apparatus comprising:
   an actuator, located remotely from the seatbelt mechanism at a location within reach of a vehicle occupant, and
   at least a second actuator located at a remote location selected from under the hood, in the glovebox, or in the trunk;
   a cable operatively coupled between each actuator and the locking member such that independently activating any actuator causes the locking member to disengage from the locking point.

* * * * *